Figure 1:
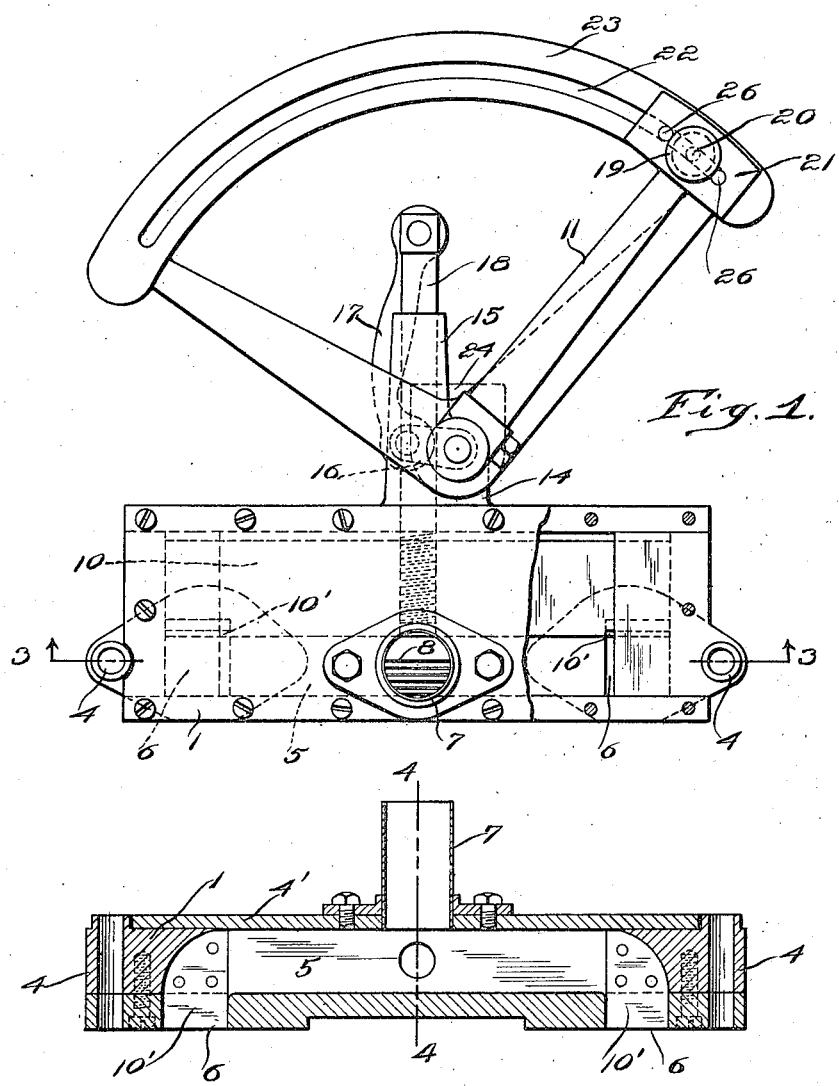

Jan. 2, 1923.

W. A. GILE.
INTERNAL COMBUSTION ENGINE.
FILED JAN. 2, 1918.

1,440,592.

3 SHEETS—SHEET 2.

Inventor:
William A. Gile
by Geo. K. Woodworth
atty.

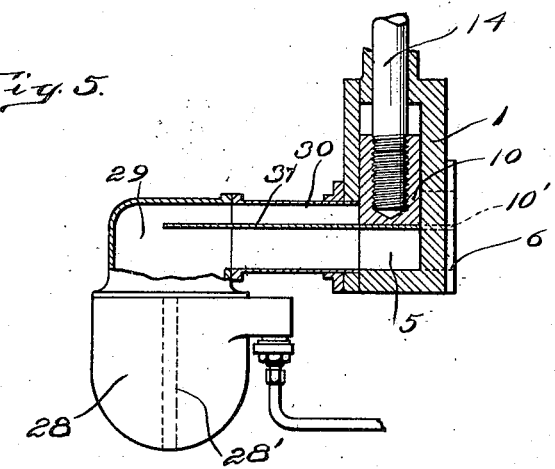
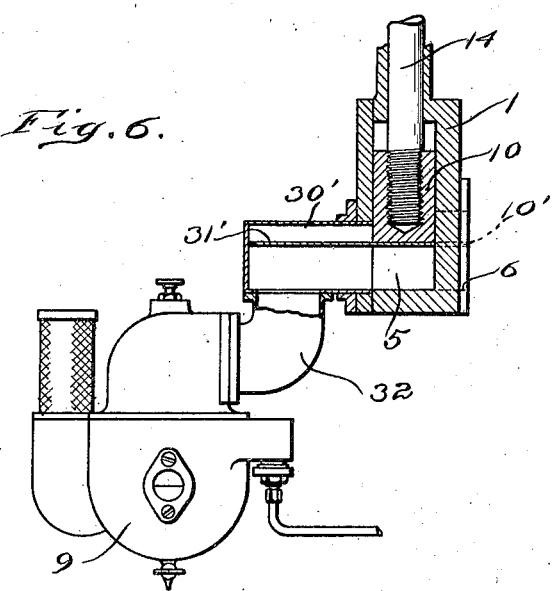

Patented Jan. 2, 1923.

1,440,592

UNITED STATES PATENT OFFICE.

WILLIAM A. GILE, OF STONEHAM, MASSACHUSETTS, ASSIGNOR, BY MESNE ASSIGNMENTS, TO GEORGE K. WOODWORTH, OF BROOKLINE, MASSACHUSETTS.

INTERNAL-COMBUSTION ENGINE.

Application filed January 2, 1918. Serial No. 209,825.

*To all whom it may concern:*

Be it known that I, WILLIAM A. GILE, a citizen of the United States, and a resident of Stoneham, in the county of Middlesex and State of Massachusetts, have invented a new and useful Improvement in Internal-Combustion Engines, of which the following is a specification.

My invention relates to valves for internal combustion engines and its object is to provide a valve whereby condensation or precipitation of the hydrocarbon fuel in the intake pipe is prevented by maintaining the fuel charge at a high velocity in the intake when the engine is partially throttled, as well as when the valve is wide open, thereby eliminating the use of devices and arrangements heretofore employed for preventing such condensation, such for example as devices for heating the incoming gas and arrangements comprising the casting of the intake integral with the engine or enclosing the same within the casing.

As is well understood, when the throttle valve of the gas engine is only partially open the intake pipe which is connected to the carbureter is filled with gas which on account of the small opening through which it passes by the valve into the cylinder travels at a relatively low velocity, and for this reason there is a considerable amount of precipitation or condensation of gasolene or other hydrocarbon fuel in the intake. As the engine is brought up to speed and the valve more widely opened this precipitation is carried into the cylinder choking the latter with a mixture which is too rich, thereby producing incomplete combustion, carbonization, etc., and making it impossible to completely control the mixture by the carbureter adjustments.

I have discovered that the precipitation above referred to can be prevented by maintaining the gaseous charge at a high velocity when the valve is only partially open and to this end my invention comprises a member, such as a valve casing, or a valve casing and an intake pipe or extension attached thereto, connected between the carbureter and the engine cylinder, and a valve or other suitable means for varying the effective area of the passageway through said casing, or casing and pipe or extension, uniformly throughout its entire length. In one form of my invention an intake pipe is divided longitudinally into compartments and means such as a plunger is arranged to move successively past said compartments as the valve is opened or closed. In all embodiments of my invention the velocity of the charge is substantially the same in all parts of the intake or passageway between the carbureter and the cylinder from the moment it leaves the former until it reaches the latter.

Several embodiments of my invention are shown in the accompanying drawings in which—

Figure 2:
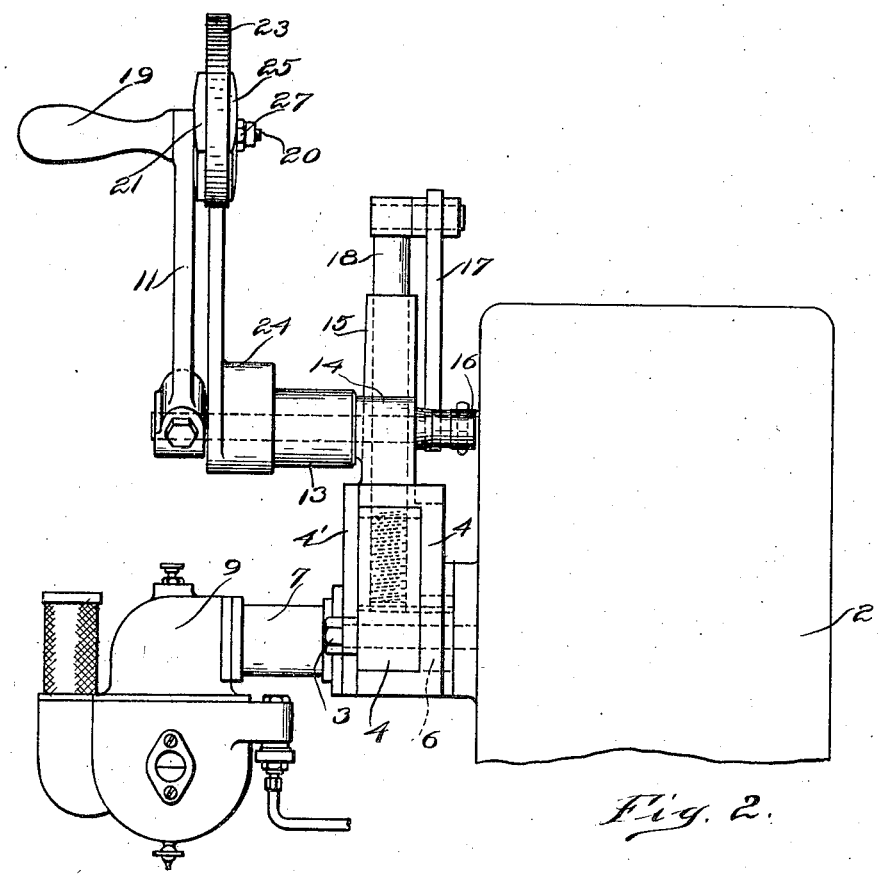
Figure 4:
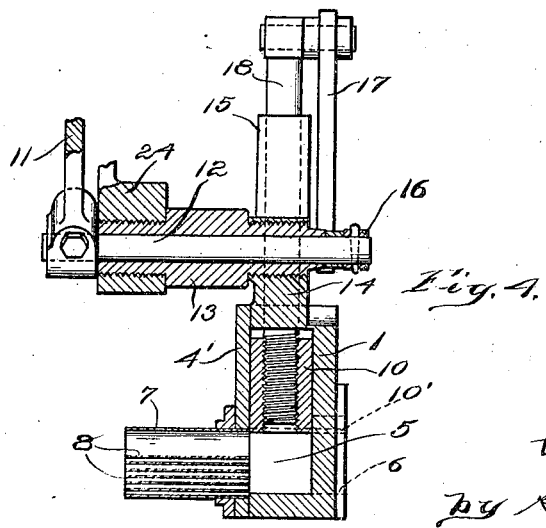

Figure 1 is a front elevation of a valve involving my invention. Fig. 2 is a side view showing the valve connected to the cylinder and attached to the carbureter. Fig. 3 is a horizontal section taken on the line 3—3 of Fig. 1. Fig. 4 is a vertical section taken on the line 4—4 of Fig. 3, certain parts being shown in elevation. Figs. 5 and 6 are fragmentary sectional views of modifications.

It will be understood that my invention may be incorporated in a variety of forms and that particular mechanism herein described with which I have demonstrated my invention in practice is intended for illustrative purposes only.

In the embodiment of my invention shown in the drawings a valve casing 1 is attached to the cylinders 2 by bolts 3 passing through holes in the lugs 4, 4 which are integral with the casing. The casing is provided with a chamber 5 terminating in two squared branches 6, 6 which communicate with the engine cylinders. Attached to the front plate 4' of the casing and communicating with said chamber and branches is a short pipe 7 divided in the present instance into longitudinal compartments by plates 8, 8 which extend transversely of the same. In this connection it will be obvious that various other means may be employed for dividing said pipe into longitudinal compartments and that I do not limit myself to the particular means herein shown. A carbureter 9 or other suitable source of gaseous fuel is attached to the outer end of the pipe 7. While various means may be employed to co-operate with the pipe 7 and the branches 6 in order to control the passage of fuel through the same, in the present instance I have shown a plunger valve 10 arranged to move past said partitions successively and the ends of said plunger which are opposite the branches 6, 6 are provided with rearwardly extending plates 10′, 10′ that extend out flush with the rear wall of the chamber and closely fit the space between the vertical walls of said branches.

It will be obvious that when the plunger is raised to uncover only the lowermost compartment in the pipe 7 the plates 10′ will be above the bottoms of the branch passageways 6 a distance substantially equal to the height of said lowermost compartment so that the effective area of the passageway between the carbureter and cylinder is substantially uniform throughout the entire length thereof, whereby the gas passing from the carbureter through said compartment and into the chamber 5 and out by way of the branches 6, 6 to the cylinders will have substantially the same velocity at all points in its travel. In this way, as I have ascertained in practice, precipitation or condensation of the hydrocarbon fuel is absolutely prevented.

In the modification shown in Fig. 5, the carbureter 28 provided with the venturi 28′ is provided with a squared gas chamber 29 which is suitably attached to squared extension 30 of the valve casing, said extension being integral with said casing or attached thereto as shown. The plate 31, which is secured to the bottom of the plunger, is arranged to lie snugly against the vertical walls of the chamber 29 and extension 30, and terminates over the upper end of the venturi.

In Fig. 6, a carbureter of the type shown in Fig. 2 is connected by the elbow 32 with the squared extension 30′ of the valve casing and the plate 31′ attached to the bottom of the plunger has its sides fitting snugly against the vertical walls of said extension and its outer end against the end wall thereof.

If the extensions 30, 30′ are omitted the carbureter is, of course, connected directly to the valve casing 1.

In both modifications, the operation of the plunger will vary the effective area of the passageway between the carbureter and the cylinder, uniformly throughout the entire length thereof so that gas will have a uniform velocity in its passage from the carburetor to the cylinder.

Various means may be employed to actuate the valve and in the present instance I have shown a lever 11 secured to the shaft 12 which has its bearing in the journal 13, the latter passing through and being threaded to an offset 14 integral with the tube 15 rising from the top of the valve casing. The end of the shaft which projects through said journal is rigidly connected with the crank 16 and the link 17 is pivotally connected to the latter and to the plunger rod 18 arranged for reciprocation within the tube 15. The handle 19 is connected to the end of the lever 11 and a pin 20 screwed into the plate 21 which is rigidly connected with said lever or integral therewith passes through the slot 22 in the arcuate guide 23 which is attached to the journal 13 by the boss 24. A spring plate 25 on the opposite side of the guide from the plate 24 is apertured to receive the pin 20 and two pins 26, 26 which are secured to the plate 21 and project through the slot 22. A nut 27 threaded to the pin forces the spring plate against the guide and holds the plate 21 in frictional engagement therewith so that the plunger will be retained in any position in which it is placed by the operation of the lever.

Having thus described simple illustrative embodiments of my invention without however limiting myself thereto what I claim and desire to secure by Letters Patent is:—

1. The combination with an internal combustion engine of an intake valve comprising a chamber having an outlet communicating with the engine cylinder, a pipe connecting said chamber to a source of gas, means dividing said pipe longitudinally, a plunger in said chamber arranged to move successively past said means as the valve is opened and closed, and means carried by said plunger and extending into said outlet for varying the effective area of the latter.

2. The combination with an internal combustion engine of an intake valve comprising a chamber having a plurality of outlets each communicating with one of the engine cylinders, a pipe connecting said chamber to a source of gas, means dividing said pipe longitudinally, a plunger in said chamber arranged to move successively past said means as said valve is opened and closed, and means carried by said plunger and extending into said outlets respectively for varying the effective areas of the latter.

3. The combination with an internal combustion engine, of an intake valve comprising an elongated chamber having a plurality of outlets each connected directly with one of the engine cylinders, a source of gas connected to said chamber, and an elongated plunger co-extensive in length with said chamber, said plunger being constructed and arranged to vary the effective area of said chamber and to open and close said outlets whereby the gas will have a uniform velocity in its passage from the carbureter to the cylinders.

4. The combination with an internal combustion engine, of an intake valve comprising a chamber having an outlet connected directly with the engine cylinder, a source of gas connected to said chamber, and a plunger in said chamber, said plunger being constructed and arranged to vary the effective area of said chamber and to open and close said outlet whereby the gas will have a uniform velocity in its passage from the carbureter to the cylinder.

In testimony whereof, I have hereunto subscribed my name this 27th day of December, 1917.

WILLIAM A. GILE.